United States Patent Office 3,234,112
Patented Feb. 8, 1966

3,234,112
PROCESS OF PRODUCING ORGANIC LEAD COMPOUNDS
David G. Braithwaite, Chicago, Ill., assignor to Nalco Chemical Company, Chicago, Ill., a corporation of Delaware
No Drawing. Filed Mar. 21, 1961, Ser. No. 97,146
14 Claims. (Cl. 204—59)

This invention relates to a process of producing organic lead compounds and more particularly to a process of producing tetramethyl lead, tetraethyl lead, tetraphenyl lead, and other compounds of lead containing hydrocarbon radicals linked to a lead atom. The invention is especially concerned with a process wherein an electrolyzing current is passed through a lead anode and an electrolyte containing a Grignard reagent to a suitable inert cathode.

One way of carrying out this process is to employ a cell in which the anode consists of lead in particulate form, such as pellets, which are separated from the cathode by a porous membrane or screen. The cell is constructed in such a way that the electrolyte can flow through the porous membrane or screen but the openings in the porous membrane or screen are normally small enough to prevent the lead pellets from coming in contact with the cathode and thereby creating a short circuit in the cell. It has been found in the operation of such a cell that a fine black precipitate tends to form and on occasion short circuiting occurs due to the presence of this precipitate.

One of the objects of the present invention is to provide a method of producing organic lead compounds by an electrolyzing process of the type described in which interference with the operation of the process due to said black precipitate is minimized.

Another object is to provide a method of making organic lead compounds by a process of the type described in which the cell can be operated over a long period of time without cleaning. Other objects will appear hereinafter.

In accordance with this invention these objects are accomplished by passing an electrolyzing current through a lead anode and a chemically inert cathode in a substantially anhydrous solution of a Grignard reagent in a substantially inert solvent for said Grignard reagent, thereby forming an organic lead compound, and periodically reversing the flow of current through said anode and cathode. By carrying out the process in this manner it has been found that at least a part of the black precipitate which normally tends to form in this process is redissolved and it is possible to carry out the process without short circuiting and without cleaning the cell.

In practicing the invention the reversal of the current can be carried out at the same voltage employed in the electrolysis for relatively short periods of time or at lower voltages for longer periods of time. The voltage used in the reversed current and the period of time should be such that the formation of gas is not increased to any great extent.

The number of times the current is reversed will depend upon the particular cell but the current reversal operation should be carried out at sufficiently closely spaced intervals to maintain a substantially uniform current flow in all parts of the cell. For example, one type of cell which can be employed consists of a steel pipe with openings at the sides near the top and the bottom to introduce and withdraw the electrolyte. An opening is also provided at the top of the pipe to introduce lead pellets. The interior of the pipe is covered with one or more layers of a screening material or membrane which electrically insulates the lead pellets from the inside of the cell. A lead rod is inserted into the center of the cell longitudinally and connected to a positive source of direct current. A negative source of direct current is connected to the outside of the pipe so that the pipe itself forms the cathode. The electrolyte is recirculated externally through a heat exchanger provided with a suitable cooling jacket to regulate the temperature. A pump is provided to recirculate the electrolyte externally of the cell and a rotameter is provided to measure the rate of recirculation. Alternatively, the cooling jacket can be placed around the outside of the cell. The membrane or screening material on the inside of the pipe which separates the cathode from the lead pellets can be formed from suitable inert substances such as glass filaments, polyethylene or polypropylene, or can be composed of two or more materials of this type. For example, one type of separator consists of a screen material made from interwoven elements of polypropylene filaments and polyethylene filaments.

A cell of this type can be disposed vertically and the electrolyte can be recirculated by passing it through an inlet opening near the bottom and out of an exit near the top. Alternatively, the inlet can be near the top and the outlet near the bottom of the cell. Both types of operation have been used successfully. However, there appears to be less pressure drop when the electrolyte is introduced near the top and recirculated through an outlet near the bottom of the cell. In this type of operation, on the other hand, there is a tendency for a fine black precipitate to accumulate near the bottom of the cell.

Instead of making the cell in one piece it can be made in separate sections, that is, a top, a bottom, and a middle section. These sections are insulated from each other and parallel cathode connections are made to each. An ammeter is installed in each cathode section so that the current flowing through each section can be measured. A recording ammeter is placed in the anode leg to measure the total current flowing through the cell. In this way, it is possible to determine differences in the current between the top and bottom sections. When the process is carried out with a cell of this type it is found that after a while the current requirements of the bottom section become greater than the current requirements of the top section. So long as the ammeter readings between the top and the bottom sections remain substantially constant and the differences are relatively small, for example, 0.5–2 amperes, the cell is operated in the conventional manner with the positive source of electricity connected to the anode and the negative source of electricity connected to the cathode. When the current requirements begin to rise in the bottom section this is a signal that the black precipitate is forming in increasing amounts on the porous membrane or screen which separates the cathode from the anode pellets and it is then desirable to reverse the current by connecting the negative source of electricity to the anode and the positive source of electricity to the cathode. The current reversal is preferably carried on for a period of time such that the black precipitate is redissolved to a point where normal operation with the positive source of electricity connected to the cathode and the negative source of electricity connected to the anode will again show a relatively small uniform difference between the top and bottom sections of the cell.

The period of time required for the current reversal can be relatively small, for example, only a few minutes, where the current is substantially the same as the normal operating current, or it can be a longer period of time, say ten minutes, where lower voltages are used. In general, during a given run where the Grignard reagent in the electrolyte is converted to organic lead compounds to the extent of at least 90%, the period of current reversal does not exceed 10% of the time and is preferably not over 5%.

At times cells of the type described have been operated with a difference of 15 amperes between the top and bottom sections but generally speaking, the difference is preferably not more than 5 amperes. In any case, a rise in amperage is a signal that the black precipitate is increasing and the danger of short circuiting is more imminent.

In practicing the invention, the electrolyzing current used is normally a direct current. However, any current can be used which causes a lead anode to dissolve in the electrolyte and the same type of current can be used in periodically reversing the system. It will be understood that superimposed currents can be used, that is to say, currents in which direct current is superimposed on alternating current. It is not necessary that the same type of current be used in the reversal process as is used in the normal operating process but it is usually convenient to use the same type of current.

The invention will be further illustrated but is not limited by the following examples in which the quantities are stated in parts by weight unless otherwise indicated.

*Example I*

A pipe cell was used in this example consisting of a 3-inch diameter steel pipe cut into three 24-inch long sections, each having a smooth, foraminous polypropylene membrane sealed on the inside of the pipe at the top and the bottom. A standard 3-inch flanged T was placed at the bottom and was used as the anode electrical contact. A reservoir with solution inlet was placed on the top of the cell. A cooling jacket was placed around the cell. The entire structure was about 9 feet high. All sections were electrically insulated from each other and parallel cathode connections were made to each of the cell sections. An ammeter was installed in each cathode section so that the current flowing through each section could be measured. A recording ammeter was placed in the anode leg to measure the total current flowing through the cell. The cell was charged with lead pellets. The pipe was arranged so that the electrolyte could be directed in either direction through the cell. Means for measuring both pressure and temperature were installed at both the top and the bottom of the cell.

A Grignard solution was prepared by heating at a temperature of 38–43° C. a mixture of benzene, tetrahydrofuran, methyl chloride and magnesium in hexylethylcarbitol (the dialkylether of diethylene glycol having one terminal hexylether group and one terminal ethylether group) in proportions of 4.5 moles of benzene, 1 mole of tetrahydrofuran, 0.95 mole of magnesium and 0.98 mole of methyl chloride per mole of hexylethylcarbitol. The methyl chloride was added over a 4½ hour period at a rate sufficient to keep the reaction going while maintaining the temperature within the range of 38–43° C. An analysis of the Grignard solution showed that all of the magnesium charged was converted to Grignard reagent.

This solution was charged into the system and the first run was carried out maintaining a temperature of 23° C. Methyl chloride was added initially in order to provide extraneous methyl chloride and was also added every half hour during the run. The initial methyl-Grignard solution consisted of 70,725 grams. The initial methyl chloride addition was 2,020 grams. The amount of methyl chloride added during the run was 4,550 grams. The lead consumed during the run was 7,070 grams. The average pressure in the cell during the run was 16.8 p.s.i.g. The electrolyte was circulated from the cell through an external piping system by means of a pump and the rate of circulation was determined by a rotameter placed in the recirculating system. This rate was maintained at an average of 4.1 gallons per minute. The average voltage was 27.7. The pressure drop through the cell varied between 1 and 2 p.s.i.g. The difference in ammeter readings between the top and bottom of the cell remained constant at about 1 ampere. The solution became cloudy toward the end of the run. The run proceeded to completion without incident in 2443 ampere hours. The final solution was one phase and slightly cloudy with precipitate in suspension.

The Grignard conversion was 90.9%, the yield of tetramethyl lead 81.2% and the current efficiency 150%. The current density was 25.3 amperes per square foot at 30 volts.

In this run the initial methyl chloride concentration was .043 mole per mole of Grignard reagent.

*Example II*

The procedure was the same as in Example I except that the system temperature was increased to about 30° C. and the initial methyl chloride concentration was reduced to .03 mole per mole of Grignard reagent. The pressure drop through the cell remained fairly steady at about 2 p.s.i.g. The current flow difference also remained steady at about 1 ampere between the top and bottom sections. About an hour before the run was stopped, the lower section current began to rise, even though the current through the other two sections continued to go down. The solution became cloudy near the end of the run. The run was stopped at 2515 ampere hours of operation. The final solution was one phase and slightly cloudy with precipitate in suspension.

The Grignard conversion was 93.9% and the yield of tetramethyl lead was 91.1%. The current efficiency was 143%, and the average current density at 30 volts was 20.2 amperes per square foot.

*Example III*

A third run was conducted in the same cell and in the same manner as described in Example II except that the polarity of the cell was reversed at the start of the run and the cell was operated at 10 volts for 10 minutes with the polarity reversed. In other words, the cathode was connected to the positive side and the anode to the negative side of a source of direct current electricity. The normal operation of the cell was then resumed. The voltage was 25 volts. The amperage in the top section was 36.7, the amperage in the intermediate section was 38.1 and the amperage in the lower section was 42.8. After operating for 5 hours, the polarity was reversed again and the cell was operated for 5 minutes at 6 volts with the polarity reversed. Normal operation was again resumed. At the end of the run after 22 hours the voltage was 306, the amperage in the upper section was 21.4, the amperage in the intermediate section was 22.6 and the amperage in the bottom section was 25.6.

The Grignard conversion was 94.1, the yield of tetramethyl lead was 96.4%, the current efficiency was 149% and the average current density at 30 volts was 25.3 amperes per square foot.

*Example IV*

The cell used was the same as that used in Example I except that the membrane consisted of a corrugated foraminous material made by weaving polyethylene and polypropylene filaments. The run was made at a temperature of about 30° C., a voltage of about 30 volts and a down flow solution rate of about 4 gallons per minute. The cell polarity was reversed every 500 ampere hours and operated for 10 minutes at 10 volts. Thereafter normal operation was resumed. A series of runs was made in this manner. New lead amounting to about 63% of the total initially charged was added after each run. This series of runs represented a total of 174 hours of operation or a total of 19,860 ampere hours of operation.

The initial charge was 64,480 grams of Grignard solution as described in Example I having an initial extraneous methyl chloride content of 1307 grams. 2374 grams of methyl chloride was added during the run.

The average amperage in the top section was 38.2, in the intermediate section 38.2, and in the lower section 39.5 amperes.

All of the runs proceeded to completion without incident. The cell operation was very smooth, consistent and predictable. The cell pressure drop was about 1 p.s.i.g. The current flow difference between the top and bottom of the cell was about between 0.5 and 1.5 amperes. The polarity reversals always tended to equalize this difference in current flow.

The total Grignard conversion for all runs was 95%. The yield of tetramethyl lead was 91.5% and the current efficiency was 148%.

The current flow patterns observed during these runs indicated that the periodic reversal of cell polarity effectively removed precipitate buildups between the cathode and the membrane and kept the cell clean and operating uniformly.

The foregoing examples merely illustrate the practice of the invention and are not intended to limit the invention to a particular Grignard reagent or to a particular solvent for the Grignard reagent or to a particular type of cathode, or to a particular type of foraminous membrane separating the cathode from the anode, or to a particular temperature or pressure of operation, or to a particular amperage or voltage, or to the employment of an extraneous organic halide in the process, or to any particular way of recovering alkyl lead compounds.

The invention is especially useful in making tetra-methyl lead by a process which involves the electrolyzing of a lead anode, in a methyl-Grignard reagent with the addition of extraneous methyl chloride. It is also useful in manufacturing tetraethyl lead by electrolyzing a lead anode in an ethyl-Grignard reagent with the addition of extraneous ethyl chloride. Two or more extraneous chlorides may be added, such as, for example, both methyl chloride and ethyl chloride, to make products which are mixtures of tetraalkyl lead compounds containing both tetraethyl lead, tetramethyl lead and mixed methyl-ethyl lead compounds.

Other types of Grignard reagents can be used in carrying out the process, such as phenyl magnesium chloride or benzyl magnesium chloride or cyclohexyl magnesium chloride. Other organic halides can be used which are the same or different from the organic halides used in forming the Grignard reagent. Instead of the chlorides the corresponding iodides or bromides can be used in making the Grignard reagent. The organic halides also can be iodides or bromides, or mixtures with the chlorides.

The cathode may be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The solvent for the Grignard reagent must be relatively inert under the conditions of the process. For this purpose it should not contain any labile hydrogen which is readily reactive. It may have some dielectric properties but it should have sufficient conductivity to permit the passage of a current between the anode and the cathode. Solvents containing aliphatic hydrocarbon groups connected to oxygen atoms or nitrogen atoms are especially useful. Low boiling solvents, such as, diethylether, can be employed but are difficult to handle and require special methods for the separation of the organic metallo compounds. Solvents, such as, tetrahydrofuran, can be employed. Examples of organic ether solvents are dimethylether, diethylether, and high molecular weight dialkylethers, including the ethers of polyoxyethylene glycols, polyoxypropylene glycols and polyoxyethylene-polyoxypropylene glycols which are liquid under the conditions of reaction. Special mention may be made of the dimethylether of diethylene glycol, the dipropylether of dipropylene glycol, the dibutylether of diethylene glycol and the dimethylether of dipropylene glycol. Examples of solvents containing nitrogen are trihexylamine, triamylamine, pyridine and quinoline.

The temperatures used are normally above the freezing point of the solution and below the boiling points of the solvent and the desired organic lead compound. In general, it is preferable to use temperatures within the range of 20° C. to 50° C.

The pressures used are normally sufficient to maintain the liquid phase with the particular solvent and temperature conditions employed. It is usually preferable to operate the process under a superatmospheric pressure which does not exceed five atmospheres.

One way of carrying out the process is to electrolyze the electrolyte until the Grignard reagent therein is substantially exhausted. Another way is to separate a part of the electrolyte and recover at least a part of the desired product, thereafter returning separated solvent and also Grignard reagent to the cell.

Examples of organic halides which can be used in practicing the invention are alkyl halides, such as, for example, methyl chloride, ethyl chloride, propyl chloride, isopropyl chloride, butyl chloride, isobutyl chloride, secondary butyl chloride, tertiary butyl chloride, amyl chloride, isoamyl chloride, tertiary amyl chloride, hexyl chloride, and higher alkyl halides, and/or the corresponding bromides and iodides. The Grignard reagent can be made by reacting any of these chlorides, bromides or iodides in approximately equimolar proportions with magnesium. The reaction can be carried out with a single Grignard reagent or with a mixture of Grignard reagents. Likewise it can be carried out by adding a single extraneous organic halide or by adding a mixture of organic halides. Instead of alkyl halides aromatic halides can be used, such as phenyl chloride, bromide or iodide. Similarly, the aromatic alkyl halides can be used, such as, for example, benzyl chloride, bromide or iodide.

The quantity of the solvent employed for the Grignard reagent should preferably be such that the electrolyte remains in liquid phase during the reaction and for this purpose it is desirable to employ a minimum of about one mole of an organic ether solvent, for example, the dibutylether of diethylene glycol, or the hexylethylether of diethylene glycol per mole of Grignard reagent. The maximum amount of such organic ether solvent employed initially will ordinarily not exceed two moles of such solvent per mols of Grignard reagent.

Especially good results have been obtained by dissolving the Grignard reagent in a mixture of solvents at least one of which is an organic ether solvent of the type previously described and another is an aromatic hydrocarbon solvent such as benzene, toluene or xylene, but preferably benzene. The addition of tetrahydrofuran is desirable because it increases the conductivity initially and shortens the run. Where tetrahydrofuran is employed it is preferable to use about 0.5 to 1.5 moles per mole of total Grignard reagent. Where an aromatic hydrocarbon such as benzene is employed it is preferable to use about 3 to 7.5 moles of such aromatic hydrocarbon per mole of Grignard reagent. Where both tetrahydrofuran and an aromatic hydrocarbon such as benzene are employed it is preferable to use an amount within a weight ratio of tetrahydrofuran to aromatic hydrocarbon of 1:4 to 1:7.

In carrying out the process the initial Grignard concentration is subject to wide variation but is preferably within the range of 0.5 to 2.5 millimoles of Grignard per gram of solution.

The quantity of the extraneous organic halide is preferably within the range of 0.1 to 1.5 moles per mole of Grignard.

The invention has been operated over a wide range of current densities and at varying voltages. The spacing and size of the electrodes and the type of electrode will determine the current density. In general, a minimum current density of around 0.01 ampere per square centimeter is used. Direct current voltages as low as 2½ to 3 volts have been used and the process can also be carried out with voltages of 100 to 300 volts but in general it is desirable to use direct current voltages around 2 to 35 volts.

The current requirements are normally within the range of 2 amperes to 45 amperes. The current density will usually vary within the range of 2 amperes per square foot to 45 amperes per square foot. The optimum current density will vary somewhat depending on the temperature. In general, the higher the temperature used, the higher the current density. The temperatures of 20° C., 25° C., 30° C., 35° C., 40° C., 45° C., and 50° C. can be used with satisfactory results.

It is preferable to operate with a total concentration of extraneous organic halides within the range of 0.1 to 1.5 moles per mole of total Grignard reagent. The reaction can be controlled by varying the respective concentrations of two or more organic halides used in carrying out the process. The optimum concentrations will also vary depending upon the product which is being made. Thus, in making tetramethyl lead using methyl magnesium chloride with extraneous methyl chloride, the optimum concentration of methyl chloride is within the range of 0.1 to 0.7 mole per mole of methyl magnesium chloride. On the other hand, in making tetraethyl lead from ethyl magnesium chloride with extraneous ethyl chloride, the optimum concentration of extraneous ethyl chloride is within the range of 0.7 to 1.1 moles per mole of total Grignard reagent. The optimum concentration is preferably chosen at a level which minimizes the formation of by-product gases caused by the combination of liberated hydrocarbon radicals with each other.

In the examples used to illustrate the best mode of carrying out the invention a direct current is employed. However, as previously indicated, other forms of current can be used which cause a lead anode to dissolve in the electrolyte and other types of current can be used in periodically reversing the system, for example, an electrolyzing current can be employed which may be described as an asymmetric alternating current in which the negative peak value of the wave form varies to from 0 to $-\frac{2}{3}$ of the positive peak value. Also, a pulsating direct current can be used in which the wave form is always positive. Such currents are obtained by superimposing an alternating current on a direct current. Other types of wave forms can be used without departing from the invention.

In the examples also a cell has been used in which an electrolyzing current is passed through lead in particulate form as an anode and an inert cathode separated from said lead by a foraminous electrically insulating separator. However, other types of cells can be used. As an illustration the cell can consist of a closed vessel having a valved inlet for introducing organic halide and a valved outlet for the release of gases which is normally closed and is equipped with a pressure gauge to indicate the amount of pressure which is built up within the cell. The electrodes consist of a number of plates. These plates are held suspended from the top of the cell by means of an insulated support. They are separated from each other by a distance of about ⅛ inch. The outside plate, and every other plate, is made of steel and are connected to the negative lead of a direct current power source while the intermediate plates are made of lead and are connected to the positive lead from the same power source. The electrolyte containing the Grignard reagent is placed in the cell to at least partially cover the plates. In this type of cell an electromagnetic stirrer is preferably disposed in the bottom of the cell in order to cause circulation of the electrolyte. No external recirculation of the electrolyte is necessary but it can be employed, if desired. Similarly, the invention may be practiced with other suitable types of electrolytic cells.

The nature of the black precipitate which forms and which the invention seeks to reduce or eliminate is not definitely known but it consists predominantly of lead.

The invention is hereby claimed as follows:

1. In a process for preparing organic lead compounds wherein an electrolyte containing a Grignard reagent dissolved in an anhydrous solution of a solvent is electrolyzed between a lead anode and an inert cathode separated by a foraminous electrically non-conducting partition wherein a black precipitate containing lead tends to form on said partition, the step which comprises reversing the polarity of said anode and said cathode for a period of time sufficient to reduce the formation of said precipitate containing lead on said partition.

2. A process as claimed in claim 1 in which the period of polarity reversal does not exceed 10% of the total time required for carrying out the process.

3. A process as claimed in claim 1 in which the period of polarity reversal is less than 5% of the total operating time used in carrying out the process.

4. A process as claimed in claim 1 in which the polarity reversal is carried on at a lower voltage than the normal operating voltage.

5. A process as claimed in claim 1 in which the polarity reversal is carried out approximately every 500 ampere hours of operation for a period not exceeding 10% of the total period of normal operation.

6. A process as claimed in claim 1 in which the polarity reversal is carried out at a voltage and amperage and for a period of time such that the voltage and amperage during normal operation remains substantially constant and the amperage drop during the process is within the range of 0.5 to 5 amperes.

7. In a process for preparing organic lead compounds containing organic radicals linked to a lead atom wherein an electrolyte comprising a Grignard reagent containing excess organic halide dissolved in an anhydrous solution of a solvent is electrolyzed between a lead anode consisting of lead in particulate form and an inert cathode separated from said lead by a foraminous electrically insulating separator, said foraminous separator being in direct contact on one side with the outer boundaries of said lead particles and on the opposite side being in direct contact with said inert cathode, said anhydrous solution of said Grignard reagent being circulated through said particulate lead and through said foraminous separator into contact with said cathode and black by-product solids containing lead forming in said process and accumulating on said separator, the step which comprises periodically reversing the flow of electrolyzing current through said anode and said cathode for relatively short periods of time sufficient to at least partly dissolve said by-product solids containing lead which accumulate on the surface of said separator.

8. A process as claimed in claim 7 in which the period of current reversal does not exceed 10% of the normal operating period.

9. A process as claimed in claim 7 in which the period of current reversal is sufficient to maintain a difference of not more than two amperes between the point of induction of said circulating solution and the point of exit of said solution.

10. A process as claimed in claim 7 in which said solution is circulated downwardly through said anode.

11. A process as claimed in claim 7 in which the Grignard reagent in said solution is an alkyl Grignard reagent.

12. A process as claimed in claim 7 in which the Grignard reagent in said solution is an alkyl magnesium chloride.

13. A process as claimed in claim 7 in which the Grignard reagent in said solution is methyl magnesium chloride and methyl chloride is added to said solution as an extraneous organic halide.

14. A process as claimed in claim 7 in which the Grignard reagent in said solution is ethyl magnesium chloride and ethyl chloride is added to said solution as an extraneous organic halide.

References Cited by the Examiner
UNITED STATES PATENTS

| | | | |
|---|---|---|---|
| 892,486 | 7/1908 | Woolf | 204—149 |
| 2,451,341 | 10/1948 | Jernstedt | 204—228 |
| 2,535,193 | 12/1950 | Galingaert | 204—59 |
| 2,935,454 | 5/1960 | Tokumoto | 204—64 |
| 2,960,450 | 11/1960 | Giraitis et al. | 204—59 |
| 3,007,857 | 11/1961 | Braithwaite | 204—59 |
| 3,007,858 | 11/1961 | Braithwaite | 204—59 |
| 3,028,319 | 4/1962 | Kobetz | 204—59 |
| 3,028,325 | 4/1962 | Pinkerton | 204—59 |
| 3,069,334 | 12/1962 | Ziegler et al. | 204—59 |
| 3,100,181 | 8/1963 | Ryzner et al. | 204—59 |
| 3,141,841 | 7/1964 | Braithwaite et al. | 204—59 |

FOREIGN PATENTS

| | | |
|---|---|---|
| 839,172 | 6/1960 | Great Britain. |
| 614,688 | 2/1961 | Canada. |

OTHER REFERENCES

Hein et al.: "Z. für Anorg. Allgem. Chem.," vol. 141, pages 161–227 (1924).

Journal of the American Chemical Society, 52 (1930), pages 4904–4906.

Transactions of the Electrochemical Society, vol. 82 (1942), pages 297–304.

JOHN H. MACK, *Primary Examiner.*

JOHN R. SPECK, WINSTON A. DOUGLAS,
*Examiners.*